United States Patent
Hwang et al.

(10) Patent No.: US 11,998,162 B2
(45) Date of Patent: Jun. 4, 2024

(54) SUPPORT DEVICE OF CLEANER AND CLEANER UNIT

(71) Applicant: LG Electronics Inc., Seoul (KR)

(72) Inventors: Philjae Hwang, Seoul (KR); Mantae Hwang, Seoul (KR); Jungbae Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 857 days.

(21) Appl. No.: 17/021,679

(22) Filed: Sep. 15, 2020

(65) Prior Publication Data

US 2020/0405113 A1 Dec. 31, 2020

Related U.S. Application Data

(63) Continuation of application No. 16/446,449, filed on Jun. 19, 2019, now Pat. No. 10,842,335, which is a (Continued)

(30) Foreign Application Priority Data

| Mar. 3, 2017 | (KR) | 10-2017-0027898 |
| Aug. 28, 2017 | (KR) | 10-2017-0108875 |

(51) Int. Cl.
*A47L 9/28* (2006.01)
*A47L 5/22* (2006.01)
(Continued)

(52) U.S. Cl.
CPC ............ *A47L 9/2873* (2013.01); *A47L 5/225* (2013.01); *A47L 5/24* (2013.01); *A47L 5/28* (2013.01);
(Continued)

(58) Field of Classification Search
CPC .......... A47L 9/2873; A47L 5/225; A47L 5/24; A47L 5/28; A47L 9/0027; A47L 9/0054;
(Continued)

(56) References Cited

U.S. PATENT DOCUMENTS

| 4,665,582 A | 5/1987 | Richmond et al. |
| 4,670,701 A | 6/1987 | Sako et al. |

(Continued)

FOREIGN PATENT DOCUMENTS

| CA | 2276796 | 1/2000 |
| CA | 2374961 | 11/2001 |

(Continued)

OTHER PUBLICATIONS

Korean Office Action in Korean Appln. No. 10-2020-0093152, dated Sep. 29, 2020, 117 pages (with English translation).

(Continued)

*Primary Examiner* — David Redding
(74) *Attorney, Agent, or Firm* — Fish & Richardson P.C.

(57) ABSTRACT

A support device of the cleaner includes a charging stand body provided with a charging port for charging the cleaner and a plurality of fixing parts disposed to be spaced apart from each other on the charging stand body and each having a fixing groove in which a fixing protrusion provided on the cleaner is accommodated.

17 Claims, 14 Drawing Sheets

Related U.S. Application Data continuation of application No. PCT/KR2018/002582, filed on Mar. 5, 2018.

(51) Int. Cl.
*A47L 5/24* (2006.01)
*A47L 5/28* (2006.01)
*A47L 9/00* (2006.01)
*A47L 11/40* (2006.01)
*H02J 7/00* (2006.01)

(52) U.S. Cl.
CPC .......... *A47L 9/0027* (2013.01); *A47L 9/0054* (2013.01); *A47L 9/0063* (2013.01); *A47L 9/2884* (2013.01); *A47L 11/4027* (2013.01); *A47L 11/4091* (2013.01); *H02J 7/0044* (2013.01)

(58) Field of Classification Search
CPC .. A47L 9/0063; A47L 9/2884; A47L 11/4027; A47L 11/4091; H02J 7/0044; Y02E 60/10
See application file for complete search history.

(56) References Cited

U.S. PATENT DOCUMENTS

| | | | |
|---|---|---|---|
| D348,548 S | 7/1994 | Pino | |
| 6,148,474 A | 11/2000 | Ohara et al. | |
| 9,757,001 B2 | 9/2017 | Hwang et al. | |
| 2011/0219571 A1 | 9/2011 | Dyson et al. | |
| 2016/0051109 A1 | 2/2016 | Hwang et al. | |
| 2018/0125314 A1* | 5/2018 | Kim | A47L 5/38 |

FOREIGN PATENT DOCUMENTS

| | | |
|---|---|---|
| CN | 1323565 A | 11/2001 |
| CN | 105395132 | 3/2016 |
| DE | 3540898 | 5/1986 |
| DE | 202015103964 | 10/2015 |
| JP | 2001149289 | 6/2001 |
| JP | 2002028120 | 1/2002 |
| JP | 2003093301 | 4/2003 |
| JP | 2004119165 | 4/2004 |
| JP | 2011-189132 | 9/2011 |
| JP | 2014-124443 | 7/2014 |
| JP | 2014200379 | 10/2014 |
| JP | 2015134131 | 7/2015 |
| JP | 2016-131776 | 7/2016 |
| JP | 2016137165 A | 8/2016 |
| KR | 20010106162 A | 11/2001 |
| KR | 10-0495137 | 4/2003 |
| KR | 20030026910 | 4/2003 |
| KR | 20030097528 | 12/2003 |
| KR | 1020120103956 | 9/2012 |
| KR | 20160023134 | 3/2016 |
| KR | 20160026122 | 3/2016 |
| WO | WO2015129387 | 9/2015 |
| WO | WO 2017/195999 | 11/2017 |

OTHER PUBLICATIONS

Extended European Search Report in European Appln. No. 21187968.9, dated Nov. 9, 2021, 7 pages.
AU Office Action in Australian Appln. No. 2018227287, dated Mar. 17, 2020, 4 pages.
Extended European Search Report in European Appln. No. 18761473.0, dated Aug. 6, 2020, 3 pages.
KR Notice of Allowance in Korean Appln. No. 2019-0107771, dated Jun. 5, 2020, 4 pages (with machine translation).
United States Office Action in U.S. Appl. No. 16/691,036, dated Feb. 19, 2021, 32 pages.
Notice of Allowance in U.S. Appl. No. 16/691,036, dated Jul. 19, 2021, 10 pages.
Notice of Allowance in Korean Appln. No. 10-2017-0108875, dated Jan. 20, 2023, 5 pages (with English Translation).
Office Action in Australian Appln. No. 2022202010, dated Jun. 30, 2023, 5 pages.

* cited by examiner

SUPPORT DEVICE OF CLEANER AND CLEANER UNIT

CROSS-REFERENCE TO RELATED APPLICATIONS

This application is a continuation of U.S. application Ser. No. 16/446,449, filed on Jun. 19, 2019, which is a continuation of International Application No. PCT/KR2018/002582, filed on Mar. 5, 2018, which claims the benefit of Korean Application No. 10-2017-0108875, filed on Aug. 28, 2017, and Korean Application No. 10-2017-0027898, filed on Mar. 3, 2017. The disclosures of the prior applications are incorporated by reference in their entirety.

TECHNICAL FIELD

The present disclosure relates to a support device of a cleaner and a cleaner unit.

BACKGROUND ART

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner holder are disclosed in Korean Patent Application Publication No. 10-2012-0103956 as the prior art.

The vacuum cleaner holder according to the prior art includes a pedestal for holding a head of a vacuum cleaner to simultaneously charge and hold the vacuum cleaner and a support having charging pins for charging the vacuum cleaner.

The charging stand body according to the prior art document includes a protruding support piece in a vertical direction to support the vacuum cleaner. However, since the protruding support piece according to the prior art document has a structure that is simply inserted into a lower portion of the vacuum cleaner, it is difficult to stably support the vacuum cleaner.

DISCLOSURE OF THE INVENTION

Technical Problem

Embodiments provide a support device of a cleaner, which includes a separate fixing part that is capable of fixing the cleaner in addition to mounting of the cleaner.

Embodiments also provide a support device of a cleaner, which is capable of being easily separated by a user without performing separate manipulation so as to separate the cleaner.

Embodiments also provide a support device of a cleaner, which prevents the cleaner from being separated in a state in which a battery mounted on the cleaner remains on a charging stand body.

Embodiments also provide a support device of a cleaner, which includes an extension tube having an adjustable length to reduce a height while mounting the cleaner and a cleaner unit.

Technical Solution

In one embodiment, a support device of a cleaner includes: a charging stand body provided with a charging port for charging the cleaner; and a plurality of fixing parts disposed to be spaced apart from each other on the charging stand body and each having a fixing groove in which a fixing protrusion provided on the cleaner is accommodated.

The fixing groove may be defined in each of facing surfaces of the plurality of fixing parts.

The fixing groove may be recessed downward from a top surface of each of the plurality of fixing parts.

The fixing groove may include a first fixing groove and a second fixing groove, which are arranged in a line.

The first fixing groove may have an inlet into which the fixing protrusion is accommodated, and the first fixing groove may have a width that gradually increases from the second fixing groove to the inlet.

The charging stand body may include: a first body on which the plurality of fixing parts are disposed; and a second body protruding from the first body to support the cleaner while the cleaner is fixed to the plurality of fixing parts.

The plurality of fixing parts may protrude from the first body and be disposed to vertically overlap the second body.

The cleaner may include a dust container for storing dust, and the dust container may be seated on the second body.

A fixing protrusion of the cleaner may be accommodated into the fixing groove in a first direction that is a vertical direction, and a minimum distance between the plurality of fixing parts may be less than a width of the second body in a second direction which crosses the first direction and in which the plurality of fixing parts are arranged.

A battery accommodation space in which an auxiliary battery is accommodated is defined in the second body The auxiliary battery may be accommodated into the battery accommodation space in the same direction as that in which the cleaner is fixed to the plurality of fixing parts.

A body fixing protrusion inserted into the cleaner may be provided on the second body.

The charging port may be provided on the first body and disposed below the plurality of fixing parts.

The charging stand body may include a connector to which a nozzle is coupled so that the nozzle coupled to the cleaner is stored. The connector may have a cylindrical shape, and a hook groove hooked with a coupling hook provided on the nozzle may be defined in the connector in a circumferential direction.

In another embodiment, a cleaner unit includes: a cleaner including a cleaner body and an extension tube connected to the cleaner body, adjustable in length, and having an end to which a nozzle is coupled; and a support device supporting the cleaner in a state in which the extension tube extends in a vertical direction, The cleaner may be supported on the support device in a state in which the extension tube has a length less than a maximum length.

The cleaner may be supported on the support device in a state in which the extension tube has a minimum length.

The support device may include: a support body supporting the cleaner body; a stand extending to a lower side of the support body; and a base to which the stand is connected and which is placed on a floor.

When the cleaner is supported on the support device in a state in which the extension tube has a minimum length, an end of the extension tube may be spaced apart form a top surface of the base.

When the cleaner is supported on the support device in the state the nozzle is connected to the extension tube, the nozzle may be seated on the top surface of the base.

The charging stand body may include: a charging port for charging a battery provided in the cleaner body; and a plurality of fixing parts disposed to be spaced apart from each other on the charging stand body and each having a fixing groove in which a fixing protrusion provided on the cleaner is accommodated.

The cleaner body may include a battery housing for accommodating the battery, and the fixing protrusion may be provided on the battery housing.

The battery housing may be disposed between the plurality of fixing parts in the state in which the fixing protrusion is accommodated in the fixing groove.

The cleaner body may include: a dust separator for separating air and dust from each other; and a dust container for storing the dust separated in the dust separator, wherein the charging stand body may include: a first body including a first charging port for charging the battery provided in the cleaner body; and a second body protruding from the first body to support the dust container.

A battery accommodation space having a recessed shape for accommodating an auxiliary battery that is separably mounted on the cleaner body may be defined in the second body.

Advantageous Effects

According to this embodiment, since the cleaner is coupled to the fixing part in the state in which the cleaner is seated, the separation of the cleaner from the support device may be prevented.

Also, according to this embodiment, since the coupled state between the cleaner and the fixing part is maintained by the weight of the cleaner in the state in which the cleaner is coupled to the fixing part, the state in which the cleaner is fixed to the support device may be stably maintained.

Also, according to this embodiment, since the user lifts the cleaner to separate the cleaner from the support device, the user may easily separate the cleaner from the support device.

Also, according to this embodiment, since the fixing protrusion is provided on the battery housing, although the cleaner body is separated from the support device while the cleaner body is lifted upward, the battery mounted on the cleaner body may be prevented from remaining on the support device.

Also, according to this embodiment, since the length-adjustable extension tube is connected to the cleaner, the cleaning may be conveniently performed while the user adjusts the length of the extension tube, and since the cleaner is mounted in the state which the extension tube decreases in length, the space for mounting the cleaning may be reduced.

DETAILED DESCRIPTION OF THE EMBODIMENTS

Figure 1:
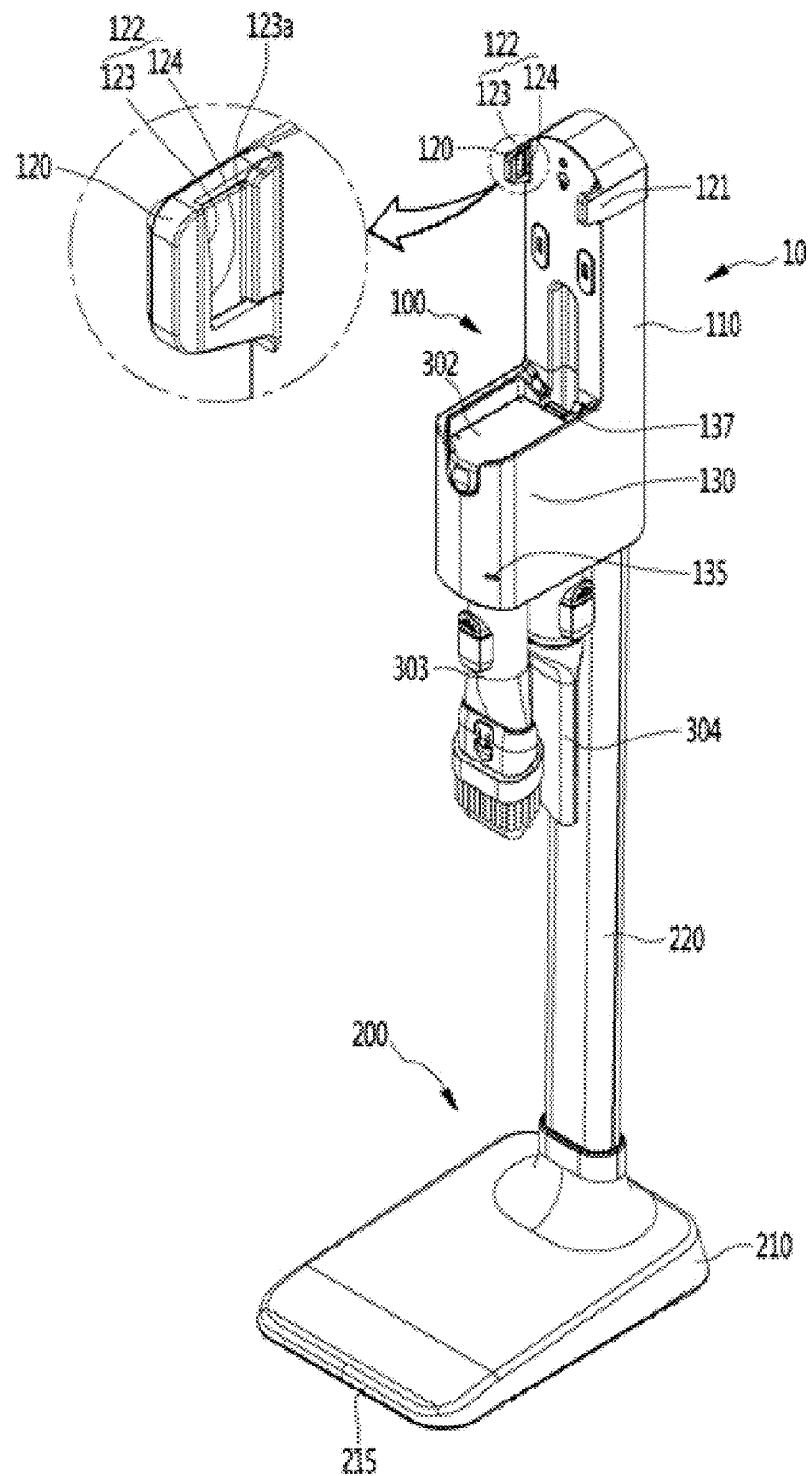
FIG. 1 is a perspective view illustrating a support device of a cleaner according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
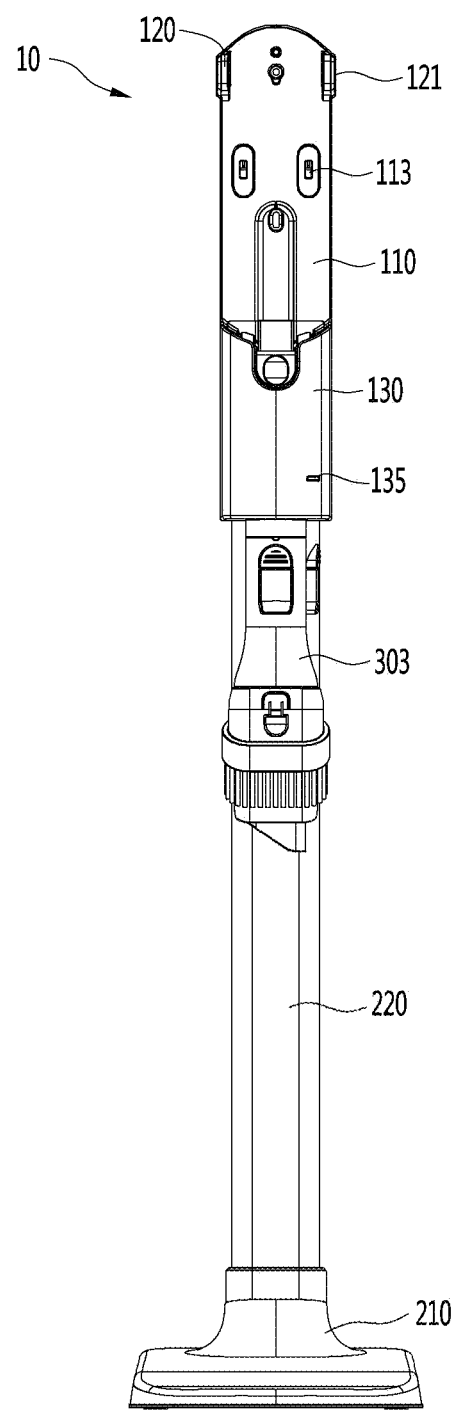
FIG. 2 is a front view illustrating the support device of the cleaner of FIG. 1.
Figure 3:
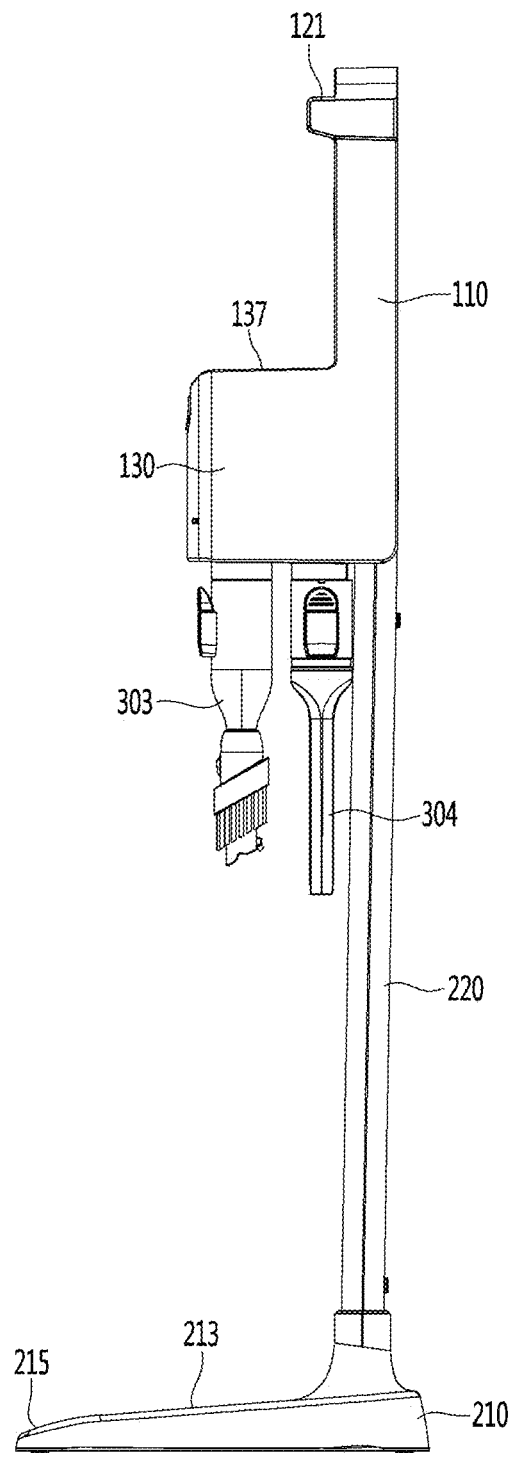
FIG. 3 is a side view illustrating the support device of the cleaner of FIG. 1.
Figure 4:
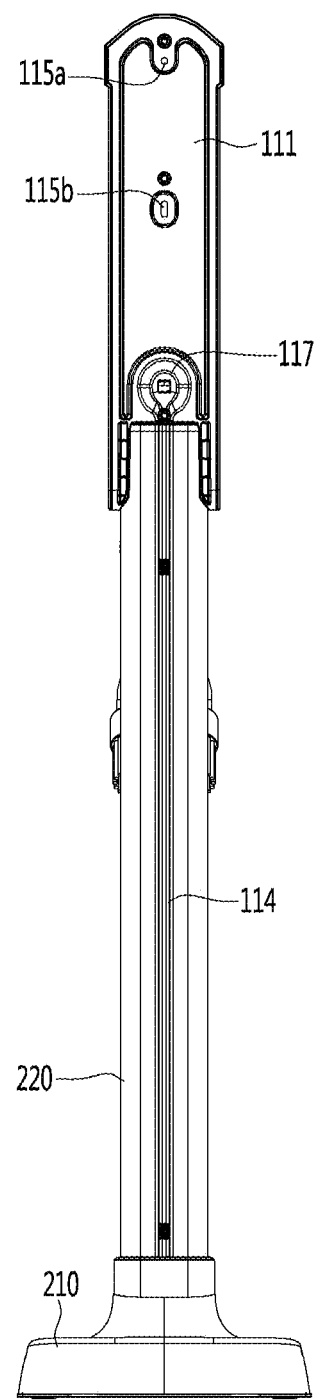
FIG. 4 is a rear view illustrating the support device of the cleaner of FIG. 1.

FIG. 1 is a perspective view illustrating a support device of a cleaner according to an embodiment of the present disclosure, FIG. 2 is a front view illustrating the support device of the cleaner of FIG. 1, FIG. 3 is a side view illustrating the support device of the cleaner of FIG. 1, and FIG. 4 is a rear view illustrating the support device of the cleaner of FIG. 1.

Figure 5:
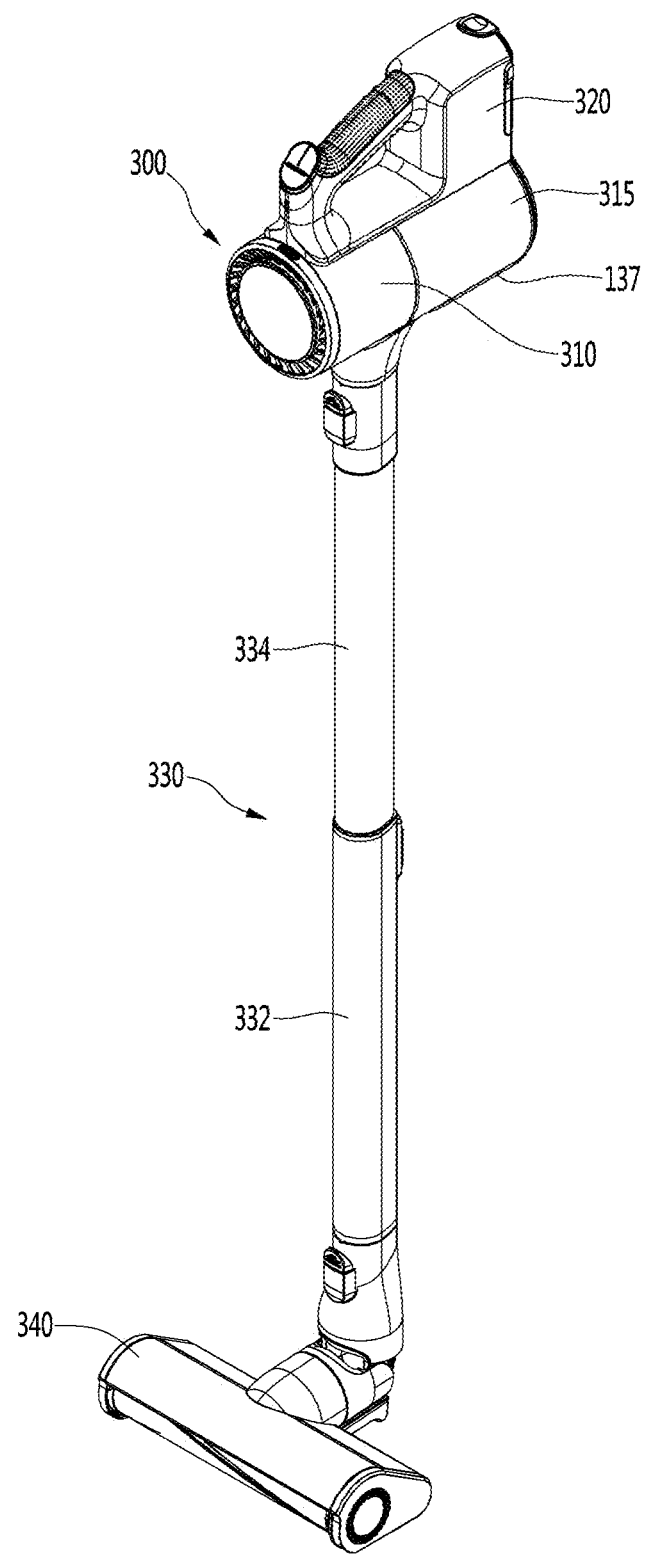
FIG. 5 is a perspective view of a cleaner according to an embodiment of the present disclosure.
Figure 6:
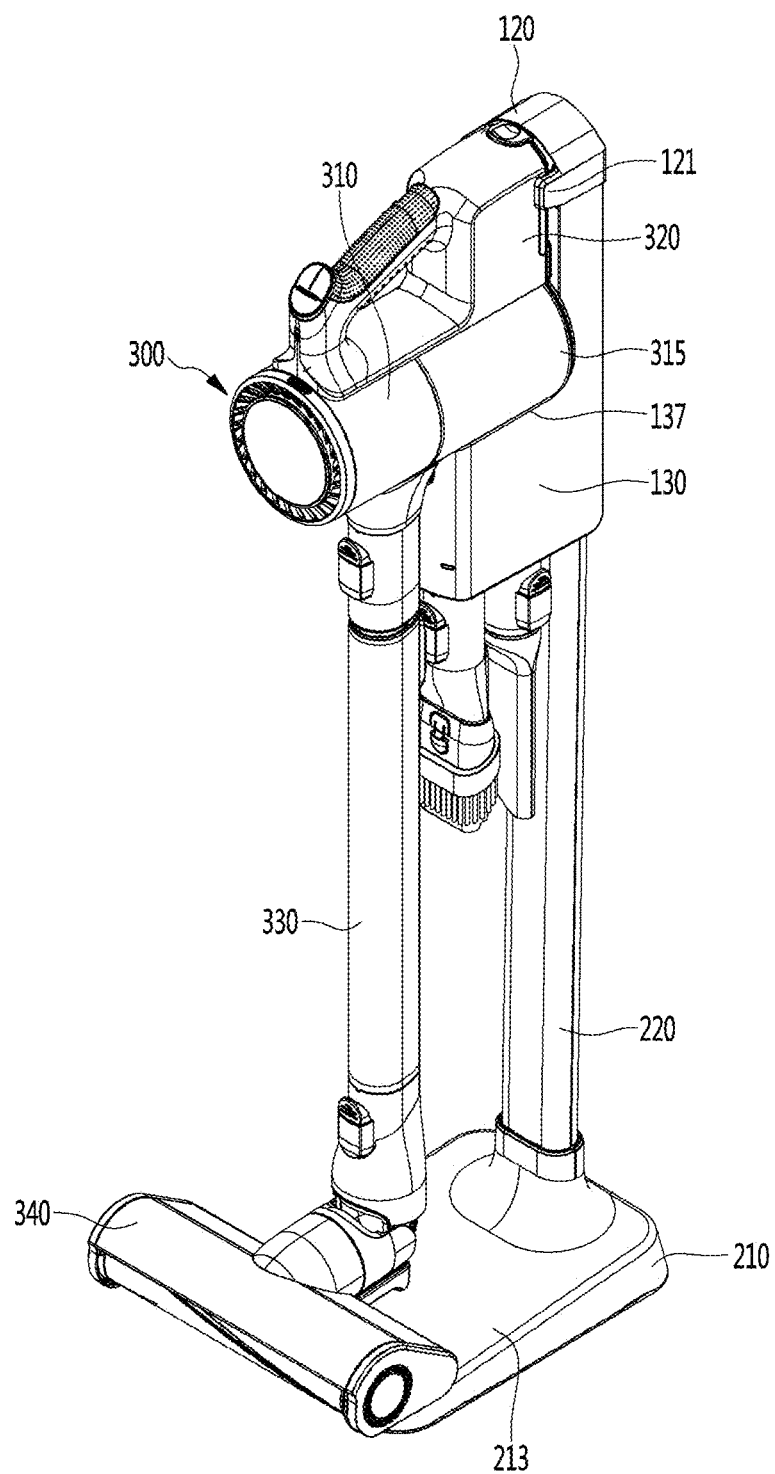
FIG. 6 is a view illustrating a state in which the cleaner is mounted on the support device of the cleaner.

FIG. 5 is a perspective view of a cleaner according to an embodiment of the present disclosure, and FIG. 6 is a view illustrating a state in which the cleaner is mounted on the support device of the cleaner.

Referring to FIGS. 1 to 6, a support device 10 of a cleaner holder according to the embodiment of the present disclosure includes a charging stand body 100 (or a support body) to support the cleaner 300. The charging stand body 100 may simultaneously support the cleaner 300 and charge the battery 324 (see FIG. 7) provided in the cleaner 300.

In this embodiment, the support device 10 and the cleaner 300 are collectively called a cleaner unit.

The cleaner 300 may include a cleaner body 310 having a suction motor, a battery housing 320 in which the battery 324 is accommodated.

An extension tube 330 to which a suction nozzle 340 is coupled is connected to the cleaner body 310.

External air is introduced into the cleaner body 310 through the suction nozzle 340 and the extension tube 330 by suction force generated by a suction motor provided in the cleaner body 310. The cleaner body 310 is provided with a dust container 315 in which dust contained in air introduced through the suction nozzle 340 is collected.

The extension tube 330 is a telescopic tube having an adjustable length. When the extension tube 330 is provided as the telescopic tube, the user may adjust a length of the extension tube 330 according to user's height so that the user cleans the floor or a space except for the floor in an optimized state.

Although is not limited, the extension tube 330 may include a first tube 332 connected to the suction nozzle 340 and a second tube 334 slidably connected to the first tube 332 and connected to the cleaner body 310.

Alternatively, the extension tube 330 may be configured to be adjustable in length by using three or more tubes.

The charging stand body 100 may include a first body 110.

The first body 110 includes a first charging port 113. The first charging port 113 may be in contact with terminals of the cleaner 300 to charge the battery 324 provided in the cleaner 300.

The charging stand body 100 may further include a second body 130 connected to the first body 110 to support the cleaner body 310.

The charging stand body 100 may further include a second body 130 connected to the first body 110 to support the cleaner body 310.

The second body 130 may receive an extra battery 302.

The extra battery 302 may be detachably connected to the cleaner 300 to supply electric power for driving the cleaner 300. As illustrated, the first body 110 and the second body 130 may be integrally formed. A second charging port 131 (see FIG. 9) configured to charge the extra battery 302 may be provided in the second body 130.

Charging of the cleaner 300 by the first charging port 113 and charging of the extra battery 302 by the second charging port 131 may be independently performed.

In detail, the cleaner 300 and the extra battery 302 may be simultaneously charged. Otherwise, any one thereof may be charged and the other one thereof may be then charged. Further, the cleaner 300 and the extra battery 302 may be alternately charged. As an example, after the battery 324 of the cleaner 300 is completely charged by the first charging port 113, the extra battery 302 starts to be charged by the second charging port 131.

Extra nozzles 303 and 304 may be coupled to the charging stand body 100. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand body 100, the risk of loss is reduced, and a user may easily use the same. The extra nozzles 303 and 304 may be named accessories.

A supporting part 137 for supporting the cleaner body 310 may be provided in the second body 130. The supporting part 137 may extend in parallel to the floor. The cleaner body 310 may come into contact with a first charging port 113 in a state in which the cleaner body 310 is supported on the supporting part 137.

When the cleaner 300 is held on the supporting part 137, the extra battery 302 may be shielded so as not to be viewed from the outside. For example, the dust container 315 is seated on the supporting part 137 and covers the extra battery 302.

As illustrated, although the support part 137 and the second body 130 may be integrally formed, the present disclosure is not limited thereto.

The charging stand body 100 may include a plurality of fixing parts 120 and 121 which are disposed to be spaced apart from each other on the charging stand body 100 and each of which has a fixing groove 122 accommodating a fixing protrusion (see reference numeral 326 of FIG. 7) provided on the cleaner 300.

For example, the plurality of fixing parts 120 and 121 may be disposed on the first body 110. For example, the plurality of fixing parts 120 and 121 may be disposed on an upper portion of a front surface of the first body 110. The plurality of fixing parts 120 and 121 may be coupled to the cleaner 300 to stably fix the cleaner 300.

The first charging port 113 may be disposed in the first body 110 at a position that is lower than that of each of the plurality of fixing parts 120 and 121.

Particularly, the plurality of fixing parts 120 and 121 may protrude forward from the front surface of the first body 110. Thus, the plurality of fixing parts 120 and 121 may vertically overlap the second body 130.

The plurality of fixing parts 120 and 121 may be disposed to be horizontally spaced apart from the first body 110. Also, the cleaner body 310 may be inserted into a space between the plurality of fixing parts 120 and 121 from an upper side of the plurality of fixing parts 120 and 121.

The fixing groove 122 may be defined in each of facing surfaces of the plurality of fixing parts 120 and 121. The fixing groove 122 may be recessed by a predetermined depth downward from a top surface of each of the plurality of fixing parts 120 and 121.

A fixing protrusion (see reference numeral 326 of FIG. 6) to be inserted into the fixing groove 122 may be provided in the cleaner body 310.

The fixing protrusion 326 may be provided on the battery housing 320 to prevent the battery 324 from being separated from the cleaner body 310 when the cleaner body 310 is separated in a state of being fixed to the plurality of fixing parts 120 and 121.

That is, the fixing protrusion 326 may be provided on each of both sides of the battery housing 320. The fixing protrusion 326 may protrude outward from each of both the sides of the battery housing 320.

The battery housing 320 may be disposed between the plurality of fixing parts 120 and 121. For this, in FIG. 2, the battery housing 320 may have a horizontal width that is equal to or less than a minimum horizontal distance between the plurality of fixing parts 120 and 121.

Also, in FIG. 2, the fixing protrusion 326 is accommodated into the fixing groove 122 in a first direction that is a vertical direction. Also, the plurality of fixing parts 120 and 121 are arranged in a second direction crossing the first direction.

A minimum distance between the plurality of fixing parts 120 and 121 in the second direction may be less than a width of the second body 130. Thus, the battery housing disposed between the plurality of fixing parts 120 and 121 may be reduced in size to prevent the charging stand body from increasing in horizontal width.

Also, referring to FIG. 6, a horizontal width of the dust container 315 in the second direction may be greater than that of the second body 130 in the second direction.

The fixing groove 122 may include a first fixing groove 123 and a second fixing groove 124, which are arranged in a line. For example, the second fixing groove 124 may be defined below the first fixing groove 123.

The first fixing groove 123 may provide an inlet 123*a* into which the fixing protrusion 326 is inserted. The inlet 123*a* may have a width greater than that of the fixing protrusion 326 so that the fixing protrusion 326 is easily inserted.

Also, the first fixing groove 123 may have a width that gradually decreases toward the second fixing groove 124. On the other side, the first fixing groove 123 may have a width that gradually increases from the second fixing groove 124 to the inlet.

The second fixing groove 124 may have a width that is equal to or slightly greater than that of the fixing protrusion 326 so that movement of the fixing protrusion 326 is minimized in the inserted state.

Also, the fixing protrusion 326 may have an inclined bottom surface so that the fixing protrusion 326 is easily inserted into the fixing groove 122.

The support device 10 of the cleaner may further include a support unit 200 for supporting the charging stand body 100.

The support unit 200 may include a base 210 seated on the floor and a stand 220 provided on the base 210. The stand 220 may be separably coupled to the charging stand body 100. The stand 220 may be coupled to the base 210 to vertically extend upward.

The support unit 200 may include a base 210 supported on a floor and a stand 220 provided in the base 210. The stand 220 may be detachably coupled to the charging stand body 100. The stand 220 is coupled to the based and extends upward.

A lower end of the stand 220 is connected to the base 210 and an upper end of the stand 220 is connected to the charging stand body 100. The upper end of the stand 220 may be connected to the charging stand body 100 on a vertically lower side of the center of gravity (G) of the charging stand body 100. Accordingly, the stand 220 may stably support the charging stand body 100.

An electric wire 114 for supplying electric power may be provided in the first body 110. The electric wire 114 may extend from a rear surface 111 of the first body 110.

A connection terminal 117 to which the electric wire 114 is connected may be provided in the first body 110. One end of the electric wire 114 may be connected to the first body 110 through the connection terminal 117.

The first charging port 113 and the second charging port 131 are connected to the connection terminal 117. Accordingly, electric power applied through the electric wire 114 may be supplied to the first charging port 113 and the second charging port 131.

The connection terminal 117 may be provided on the rear surface 111 of the first body 110. Further, the connection terminal 117 may be arranged between the first charging port 113 and the second charging port 131. That is, the connection terminal 117 may be arranged below the first charging port 113, and the second charging port 131 may be arranged below the connection terminal 117.

A power plug (not illustrated) may be connected to the other end of the electric wire 114. The power plug may be connected to a socket and the like to receive external electric power.

The electric wire 114 may be coupled to the stand 220. In detail, the electric wire 114 is connected to a rear surface of the stand 220 to extend toward the base 210. A member for fixing the electric wire 114 may be provided on the rear surface of the stand 220.

The electric wire 114 may extend to an inside of the base 210 through an upper end of the base 210 and may extend to an outside of the base 210 through a side surface or a bottom surface of the base 210 again.

A cord reel (not illustrated) on which the electric wire 114 is wound may be provided in the base 210. In detail, the cord reel may be provided inside the base 210. Thus, the user may adjust an extending length of the electric wire 114 as needed.

The base 210 may include an inclined surface 213 on which the suction nozzle 340 of the cleaner 300 is held and a stopper 215 for preventing the suction nozzle 340 of the cleaner 300 from being separated therefrom.

The stopper 215 may protrude from an end of the inclined surface 213. The stopper 215 serves to support the suction nozzle 340 such that a state in which the suction nozzle 340 is stably seated on the base 210 may be maintained.

Fixing parts 115*a* and 115*b* for fixing the charging stand body 100 to the wall surface or the like may be provided on the rear surface 111 of the first body 110. Accordingly, the charging stand body 100 may be fixed to the wall surface while being separated from the stand 220 (see FIG. 13). The fixing parts 115*a* and 115*b* may have a hole or groove shape. Accordingly, nails or the like, which are installed on the wall surface, are inserted into the fixing parts 115*a* and 115*b*, so that the first body 110 may be fixed to the wall surface.

Hereinafter, a method for coupling the cleaner 300 to the charging stand body 100 will be described.

Figure 7:
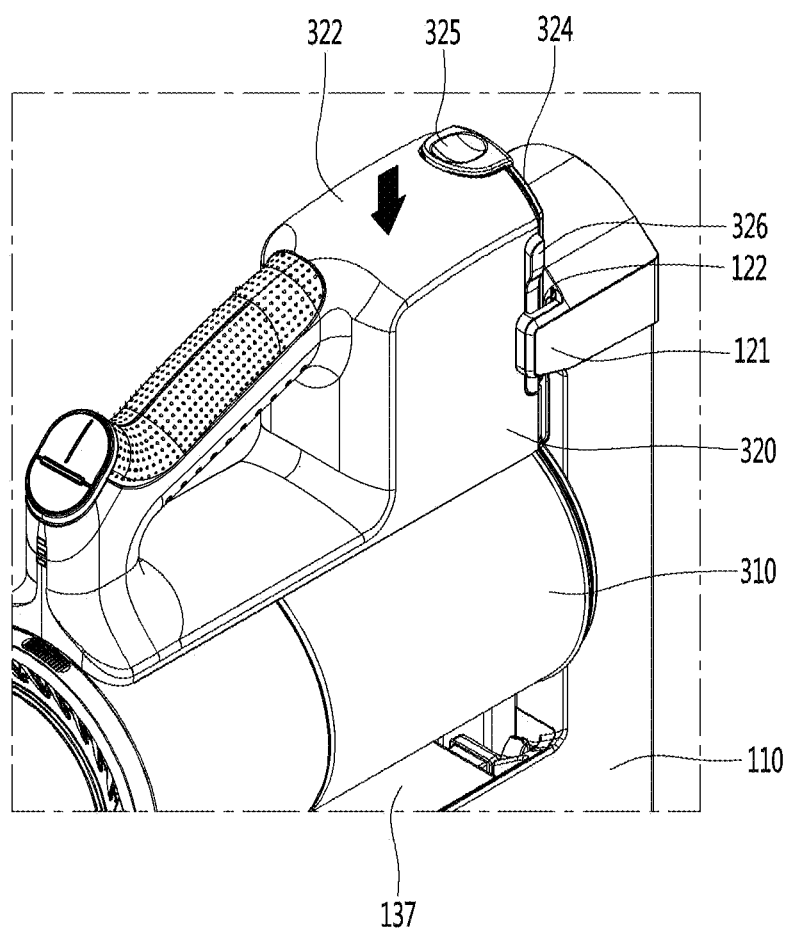
FIG. 7 is a view illustrating a state in which the cleaner is coupled to a charging stand body.

FIG. 7 is a view illustrating a state in which the cleaner is coupled to the charging stand body.

Referring to FIGS. 6 and 7, to mount the cleaner body 310 on the support device 10, the cleaner body 310 may be lifted to allow the fixing protrusion 326 to be located above the support device 10. Also, the fixing protrusion 326 of the cleaner body 310 is aligned with the fixing groove 122 of each of the fixing parts 120 and 121.

To align the fixing protrusion 326 with the fixing groove 122 of each of the fixing parts 120 and 121, the battery housing 322 is disposed between the plurality of fixing parts 120 and 121.

In this state, when the cleaner body 310 moves downward, the fixing protrusion 326 is inserted into the fixing groove 122 of each of the fixing parts 120 and 121.

Also, while the fixing protrusion 326 is inserted into the fixing groove 122 of each of the fixing parts 120 and 121, the cleaner body 310 may be seated on the supporting part 137.

In this embodiment, in the state in which the cleaner body 310 is seated on the supporting part 137, the fixing protrusion 326 may be seated on a bottom surface of the second fixing groove 124.

Alternatively, in the state in which the cleaner body 310 is seated on the supporting part 137, the fixing protrusion 326 may be spaced apart from the bottom surface of the second fixing groove 124. In this case, the cleaner body 310 may be maintained in the state of being fixed to the support device 10 as long as the cleaner body 310 is not completely withdrawn from the fixing groove 122 due to the upward lifting of the cleaner body 310.

According to this embodiment, since the user moves the cleaner body 310 upward to fixe the cleaner body 310 to the support device 10, the cleaner body 310 may be easily fixed to the support device 10.

Also, since the cleaner body 310 is lifted to be separated from the support device 10 in the state in which the cleaner body 310 is fixed to the support device 10, the cleaner body 310 may be easily separated from the support device 10.

As described above, the cleaner 300 include the length-adjustable extension tube 330. If the cleaner 300 is seated on the support device 10 in a state in which the extension tube 330 has a maximum length, the support device 10 may increase in height.

In this embodiment, the height of the support device 10 may be set so that the cleaner 300 is supported on the support device 10 in a state in which a length of the extension tube 330 is adjusted less than the maximum length.

In the state in which the extension tube 330 has the minimum length or a length that is close to the minimum length, the cleaner 300 may be supported on the support device 10. In this case, the support device 10 may be minimized in height.

When the cleaner 300 is supported on the support device 10 in the state in which the extension tube 330 has the minimum length or a length that is close to the minimum length, an end of the extension tube 330 may be spaced apart from a top surface of the base 210.

The user may mount the cleaner 300 on the support device 10 in a state in which the suction nozzle 340 is separated from the cleaner 300 or may mount the cleaner 300 on the support device 10 in a state in which the suction nozzle 340 is coupled to the cleaner 300.

According to this embodiment, in the state in which the suction nozzle 340 is separated from the extension tube 330, the cleaner 300 may be mounted on the support device 10 in the state in which the extension tube 330 has the minimum length or a length greater than the minimum length. In this case, the extension tube 330 may not interfere with the base 210.

When the suction nozzle 340 is coupled to the extension tube 330, the cleaner 300 may be mounted on the support device 10 in the state in which the extension tube 330 has the minimum length or the length that is close to the minimum length.

In this case, since a space is defined between the extension tube 330 and the base 210, the suction nozzle 340 may be disposed in the space. For example, the suction nozzle 340 may be seated on the base 210.

Also, when the user intends to mount the cleaner 300 on the support device 10 after the cleaning is performed in the state in which the extension tube 330 has the length greater than the minimum length, the cleaner 300 may be mounted on the support device 10 after reducing the length of the extension tube 330, or the extension tube 330 may be reduced in length while mounting the cleaner 300 on the support device 10.

The cleaner body 310 may come into contact with the first charging port 113 in the state in which the cleaner body 310 is supported on the supporting body 137.

In this embodiment, since the fixing protrusion 326 is provided on the battery housing 320, even though the cleaner body 310 is lifted upward to separate the cleaner body 310 from the support device 10, the battery 324 mounted on the cleaner body 310 may be prevented from reaming on the support device 10.

That is, in the state in which the battery 324 mounted on the cleaner body 310 remains on the support device 10, the separation of only the cleaner body 310 from the support device 10 may be prevented.

Figure 8:
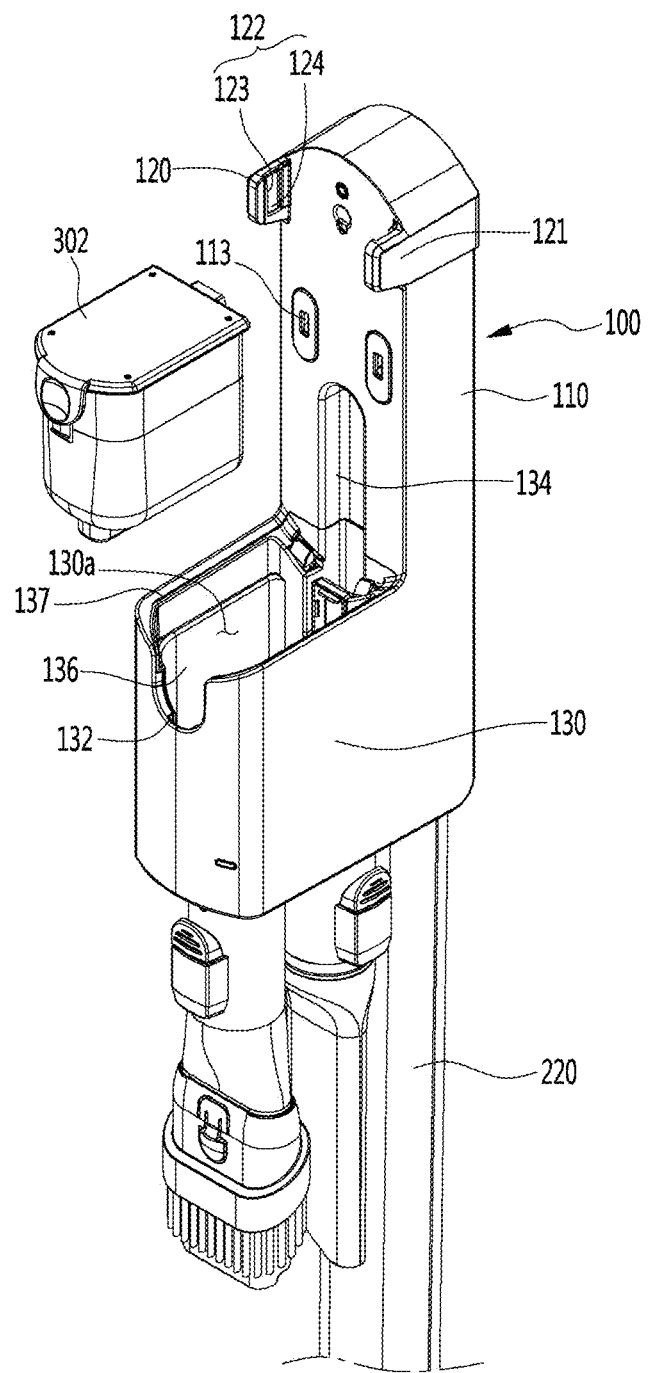
FIG. 8 is a view illustrating a state in which an auxiliary battery is separated from the charging stand body according to an embodiment of the present disclosure.
Figure 9:
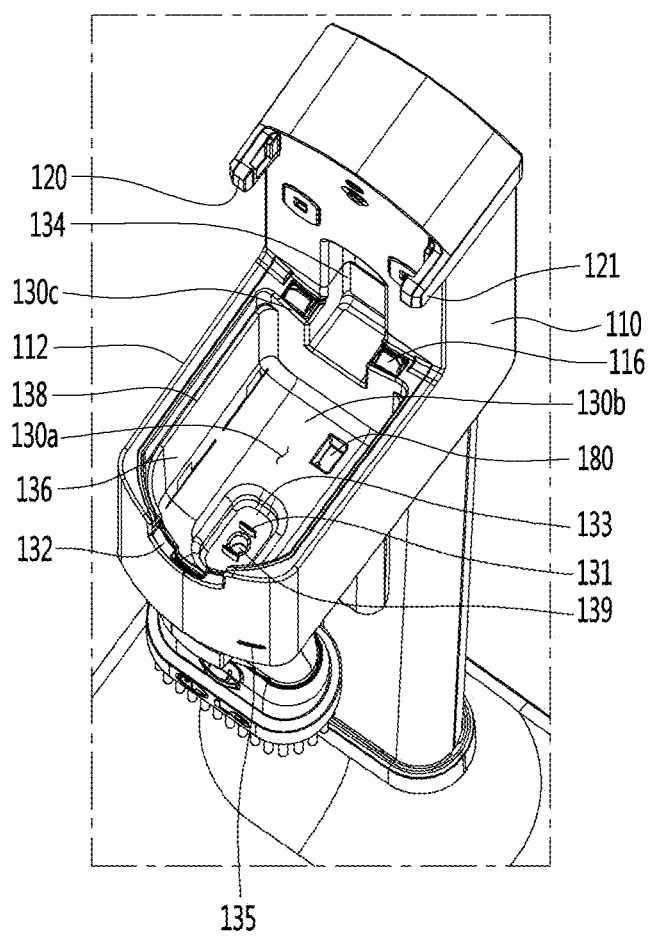
FIG. 9 is a view illustrating the inside of a second body of FIG. 8.
Figure 10:
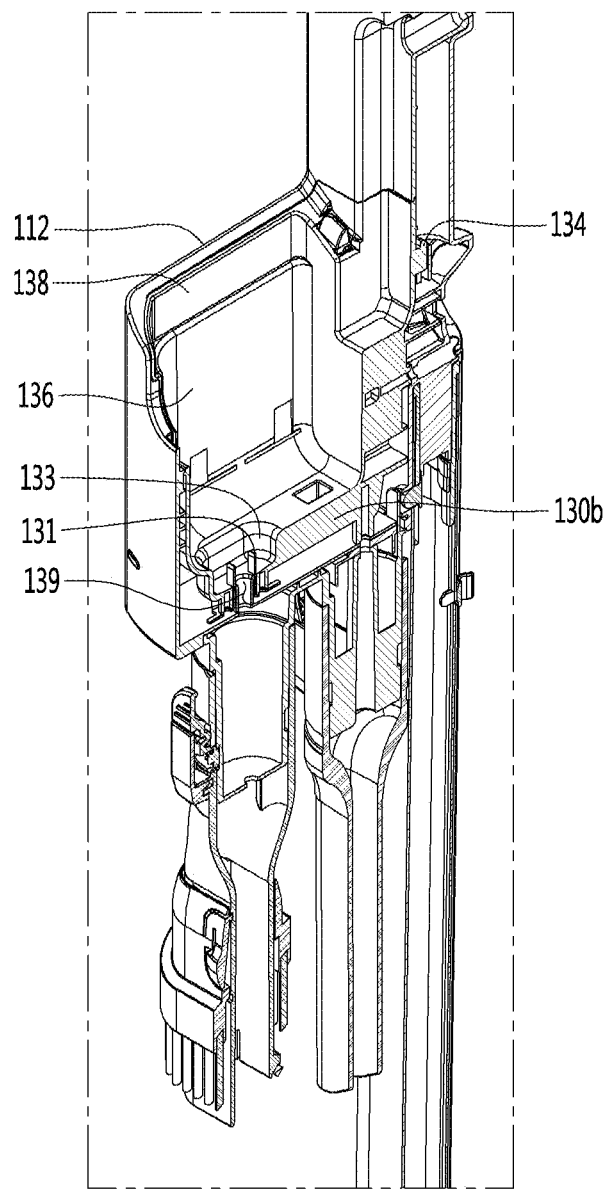
FIG. 10 is a longitudinal cross-sectional view of a first body.

FIG. 8 is a view illustrating a state in which an auxiliary battery is separated from the charging stand body according to an embodiment of the present disclosure, FIG. 9 is a view illustrating the inside of the second body of FIG. 8, and FIG. 10 is a longitudinal cross-sectional view of the first body.

Referring to FIGS. 8 to 10, a battery accommodation space 130a for accommodating the auxiliary battery 302 may be defined in the second body 130. The battery accommodation space 130a may be defined to be recessed from the second body 130. For example, the battery accommodation space 130a may be defined to be recessed downward from one surface of the second body 130.

Thus, the auxiliary battery 302 is coupled to the battery accommodation space 130a in the same direction as that in which the cleaner body 310 is coupled to the charging stand body 100.

A second charging port 131 for charging the auxiliary battery 302 is provided in the second body 130. The second charging port 131 may be disposed lower than the first charging port 113. The second charging port 131 may selectively come into contact with the auxiliary battery 302 accommodated in the second body 130.

A recess part 133 in which the second charging port 131 is disposed may be provided in the second body 130.

The recess part 133 may be defined to be recessed downward from the bottom surface of the second body 130. The second charging port 131 may be disposed on a bottom surface of the recess part 133 to protrude upward from the bottom surface of the recess part 133.

An upwardly protruding length of the second charging port 131 may be less than a depth of the recess part 133. Thus, an upper end of the second charging port 131 may be disposed below a bottom surface 130b of the battery accommodation space 130a. That is, since the second charging port 131 is accommodated in the recess part 133, damage of the second charging port 131 due to external force may be minimized.

Groove parts 132 and 134 for allowing the user to grip the auxiliary battery 302 accommodated in the battery accommodation space 130a may be defined in one side of the battery accommodation space 130a. The user may grip a side surface of the auxiliary battery 302 through the groove parts 132 and 134.

The groove parts 132 and 134 may include a first groove part 132 defined in the front of the battery accommodation space 130a and a second groove part 134 defined in the rear of the battery accommodation space 130a. The first groove part 132 may be defined in the front of the second body 130 and have a shape that is cut in a U shape, and the second groove part 134 may be recessed backward from the first body 110.

The user inserts a finger into the second groove part 134 to come into contact with a rear surface of the auxiliary battery 302 and come into contact with a front surface of the auxiliary battery 302, which is exposed through the first groove part 132. Thus, in the state in which the user grips the auxiliary battery 302, the auxiliary battery 302 may be inserted into the second body 130 or withdrawn from the second body 130.

The charging stand body 100 may further include a display part 135 for displaying a remaining amount of power of the auxiliary battery 302. For example, the display part 135 may be disposed on the second body 130.

The charging stand body 100 may further include a display unit 135 for displaying a residual amount of the extra battery 302. For example, the display unit 135 may be provided in the second body 130.

The display unit 135 may include a light emitting diode (LED) light that may display various colors. As an example, the display unit 135 may display the residual amount of the extra battery 302 in three stages. In detail, the display unit 135 may divide the residual amount of the extra battery 302 into upper, middle and lower parts, and may display different colors depending on the stages. Further, the display unit 135 may notify the user of the charging state as the display unit 135 flickers during charging of the extra battery 302.

The battery guide 136 for guiding the extra battery 302 may be provided in the second body 130. The battery guide 136 is disposed below the support part 137 and may extend downward.

The battery guide 136 may have a shape corresponding to the extra battery 302. Accordingly, a location of a terminal of the extra battery 302 inserted into the second body 130 may be accurately aligned with the location of the second charging port 131. Although not illustrated, a boss or groove for effectively guiding the insertion or the withdrawal of the extra battery 302 may be formed in the battery guide 136.

An entrance 138 through which the extra battery 302 is introduced/withdrawn may be provided in the battery guide 136. The entrance 138 may be provided on the battery guide 136 and may extend upward to have a predetermined height.

An inner peripheral surface of the entrance 138 may be stepped to the battery guide 136 to facilitate the insertion of the extra battery 302. Particularly, the inner peripheral surface of the entrance 138 may be defined outside the inner peripheral surface of the battery guide 136. Thus, the entrance 138 may have a width greater than that of the battery guide 136.

That is, since the entrance 138 having the width greater than that of the battery guide 136 is provided, the auxiliary battery 302 may be easily inserted.

A drainage hole 139 may be provided in the second body 130. The drainage hole 139 may be formed on a bottom surface of the second body 130 to communicate with an external space. The drainage hole 139 is for preventing liquid, such as water, introduced into the second body 130 from being collected inside the second body 130. Accordingly, the second charging port 131 may be prevented from being damaged by the liquid such as water.

The drainage hole 139 may be provided in the bottom surface of the recess part 133 and be disposed adjacent to the second charging port 131. Thus, a liquid such as water stagnant in the periphery of the second charging port 131 or the like may be directly drained. Also, the drainage hole 139 may be provided in plurality as illustrated in the drawing.

The second body 130 may further include a mounting detection part 180 for detecting the mounting of the auxiliary battery 302. For example, the mounting detection part 180 may be disposed on the bottom surface of the recess part 133. The mounting detection part 180 may be a micro switch that is turned on when the auxiliary battery 302 is mounted.

In general, the battery may include a charging protection circuit for preventing the battery from being damaged when a temperature increases during charging and a discharging protection circuit for preventing the battery from being damaged when a temperature increases during discharging.

In the state in which the cleaner 300 with the auxiliary battery 302 mounted is used, when the auxiliary battery 302 is discharged, the auxiliary battery has to be charged.

Here, when the auxiliary battery 302 has a temperature greater than a protection reference temperature, the auxiliary battery 302 may become a protection mode state by the protection circuit, and the charging of the auxiliary battery 302 is impossible.

In the protection mode state as described above, even though the auxiliary battery 302 is mounted on the second body 130, the remaining power of the auxiliary battery 302 may not be confirmed through the second body 130, and thus, current for charging the auxiliary battery 302 may not be supplied.

Although the auxiliary battery 302 decreases in temperature to release the protection mode, the second body does not supply the current for charging the auxiliary battery 302.

However, when the mounting of the auxiliary battery 302 is detected by the mounting detection part 180 for detecting the mounting of the auxiliary battery 302 in this embodiment, a control part (not shown) may control the second body 130 so that the current for continuously charging the auxiliary battery 302 is supplied in the state in which the mounting of the auxiliary battery 302 is detected.

In this case, even though the charging of the auxiliary battery 302 is not performed at a time point at which the auxiliary battery 302 is mounted because the auxiliary battery is in the protection mode, when the temperature decreases to release the protection mode of the auxiliary battery 302, the charging current supplied to the auxiliary battery 302 may be supplied to charge the auxiliary battery 302.

A body fixing protrusion 116 for fixing the cleaner body 310 may be disposed on the second body 130. The body fixing protrusion 116 may protrude from the second body 130. Also, an elastic part (not shown) may be connected to the body fixing protrusion 116 to allow the body fixing protrusion 116 to be selectively inserted into the second body 130 by external force.

Unlike the above-described structure, the body fixing protrusion 116 may not be disposed on the second body 130, but be disposed on the first body 110. Alternatively, since the fixed state of the cleaner body 310 is maintained by the fixing parts 120 and 121 by self-weight of the cleaner body 310, the body fixing protrusion 116 may be omitted.

The body fixing protrusion 116 may be inserted into the cleaner body 3310 to fix the cleaner body 310. A fixing groove (not shown) into which the body fixing protrusion 116 is inserted may be defined in the cleaner body 310.

The body fixing protrusion 116 may be disposed on a rear end of the supporting part 137. A portion of the body fixing protrusion 116 may protrude to the outside of the second body, and the other portion may be disposed inside the second body 130.

Here, the more a degree of the body fixing protrusion 116, which is inserted into the fixing groove of the cleaner body 310, increases, the more fixing force between the fixing protrusion 116 and the cleaner body 310 increases.

Thus, in this embodiment, a cutoff part 130c for increasing the outwardly protruding degree of the body fixing protrusion 116 may be provided in periphery of a portion at which the body fixing protrusion 116 is installed in the second body 130 so that the fixing force between the body fixing protrusion 116 and the cleaner body 310 increases.

As described above, when the external protruding degree of the fixing protrusion 116 increases by the cutoff part 130c, the fixing force between the body fixing protrusion 116 and the cleaner body 310 may increase. In this case, spring force of an elastic member for elastically supporting the body fixing protrusion 116 may be reduced to reduce material costs of the elastic member.

Figure 11:
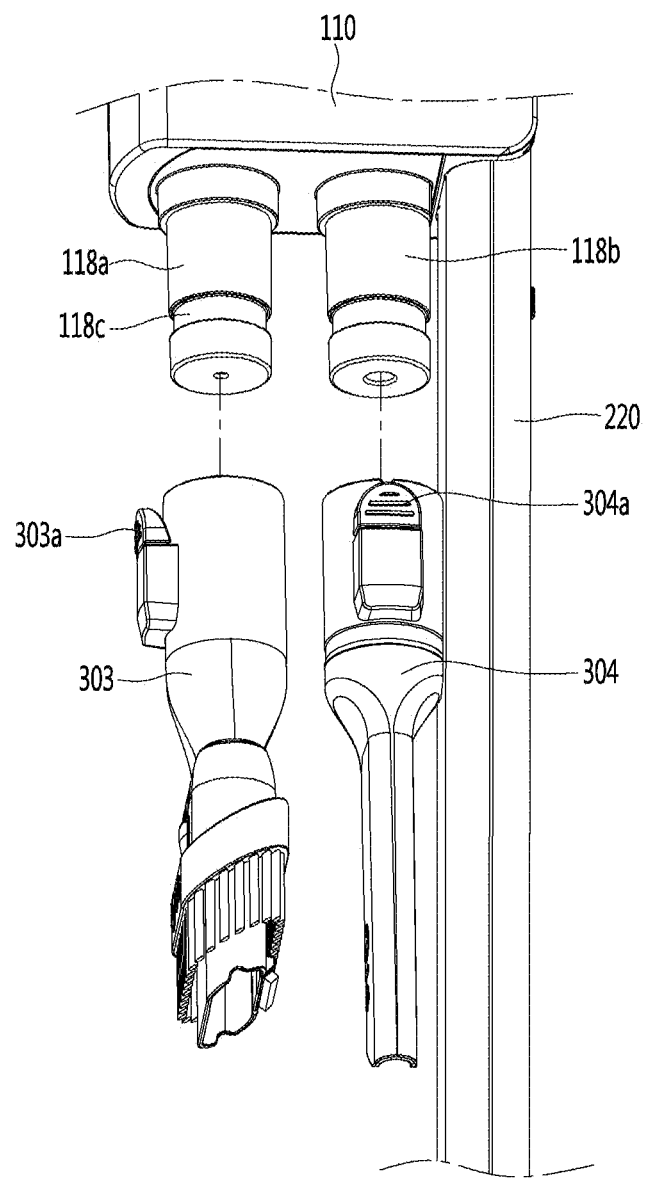
FIG. 11 is a view illustrating a state in which a nozzle is separated from the charging stand body.

FIG. 11 is a view illustrating a state in which a nozzle is separated from the charging stand body.

Referring to FIG. 11, the first body 110 may include connectors 118a and 118b to which the extra nozzles 303 and 304 are selectively coupled. The connectors 118a and 118b may extend from one side of one of the first body 110 and the second body 130.

Although is not limited, the connectors 118a and 118b may protrude downward from the bottom surface of the charging stand body 100.

The user may attach/detach the nozzles 303 and 304 to the connectors 118a and 118b as needed. Accordingly, because the extra nozzles 303 and 304 are easily stored and used, user convenience may be improved.

To couple the extra nozzles 303 and 304, each of the connectors 119a and 119b may have, for example, a cylindrical shape. Also, the connectors 118a and 118b may be coupled to be fitted into the extra nozzles 303 and 304, respectively.

The extra nozzles 303 and 304 may include coupling parts 303a and 304a coupled to the extension tube 330. The coupling parts 303a and 304a may be movably installed on the extra nozzles 303 and 304 so as to be manipulated by the user. Although not shown, a coupling hook may be disposed on an end of each of the coupling parts 303a and 304a. Since the coupling parts 303a and 304a may have a well-known structure, detailed description thereof will be omitted.

A hook groove 118c hooked with the coupling hook of each of the coupling parts 303a and 304a may be defined in each of the connectors 118a and 118b. In the coupling hook is hooked with the hook groove 118c, the extra nozzles 303 and 304 may be prevented from being separated from the connectors 118a and 118b as long as the user does not manipulate the coupling parts 303a and 304a.

The hook groove 118c may be continuously defined in a circumference direction of each of the connectors 118a and 118b so that the extra nozzles 303 and 304 are connected to the connectors 118a and 118b regardless of the user's direction.

Thus, the user may connect the extra nozzles 303 and 304 to the connectors 118a and 118b without worrying about the coupling direction. In the state in which the extra nozzles 303 and 304 are connected to the connectors 118a and 118b, the extra nozzles 303 and 304 may not be separated from the connectors 118a and 118b, but be rotatable.

When the user intends to separate the extra nozzles 303 and 304 from the connectors 118a and 118b, if the coupling parts 303a and 304a are not seen through naked eyes, the extra nozzles 303 and 304 may rotate to be seen through the naked eyes. Then, the coupling parts 303a and 304a may be manipulated to separate the extra nozzles 303 and 304 from the connectors 118a and 118b.

Figure 12:
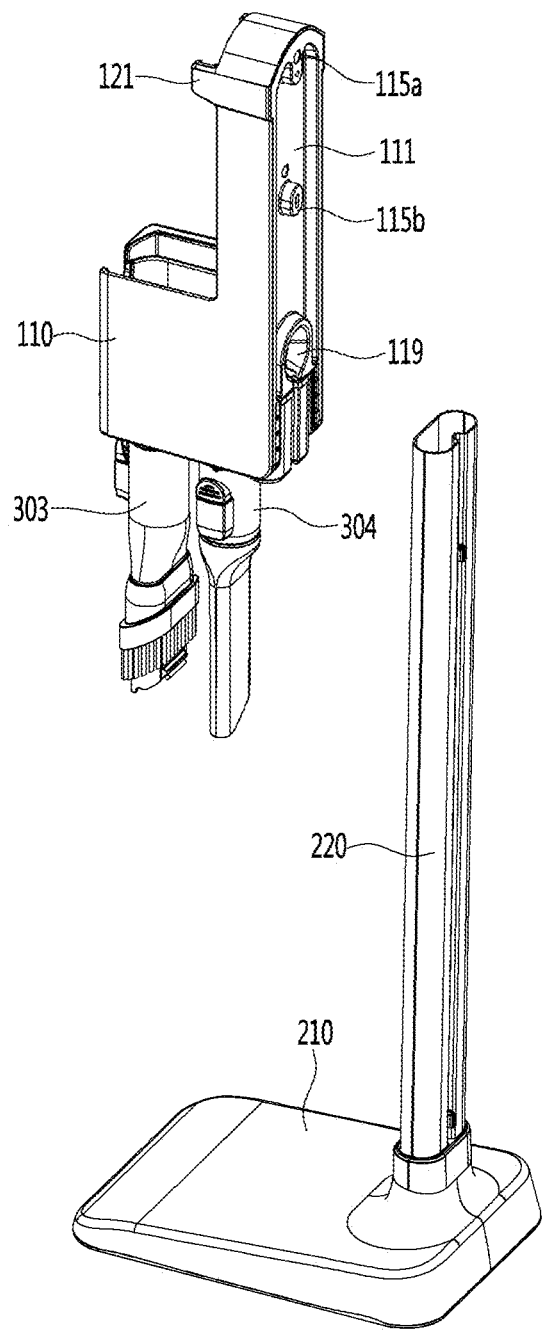
FIG. 12 is a view illustrating a state in which the charging stand body is separated from a stand.
Figure 13:
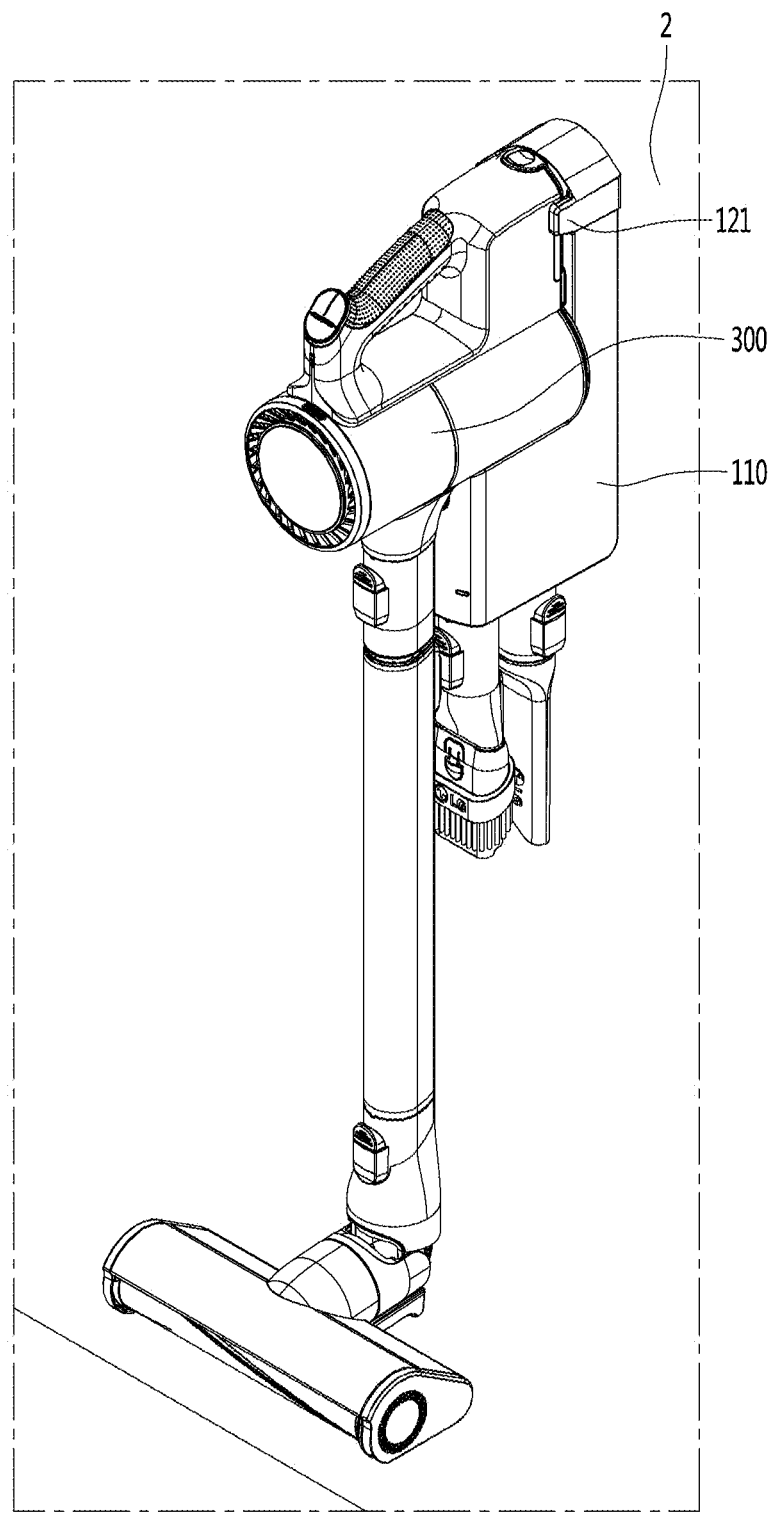
FIG. 13 is a view illustrating a state in which the charging stand body on which the cleaner is mounted is mounted on a wall.

FIG. 12 is a view illustrating a state in which the charging stand body is separated from a stand, and FIG. 13 is a view illustrating a state in which the charging stand body on which the cleaner is mounted is mounted on a wall.

FIG. 12 is a view illustrating a state in which the charging stand body is separated from the stand, and FIG. 13 is a view illustrating a state in which the charging stand body on which the cleaner is held is mounted on a wall surface.

Referring to FIGS. 12 and 13, the charging stand body 100 may include a coupling part 119 to which the stand 220 is coupled. The coupling part 119 may be provided in the first body 110. The stand 220 may be detachably coupled to the coupling part 119. Accordingly, the user may easily separate the charging stand body 100 and the stand 220 from each other.

As needed, the user may fix the charging stand body 100 from which the stand 220 is separated to a wall surface 2 using the fixing parts 115a and 115b.

Figure 14:
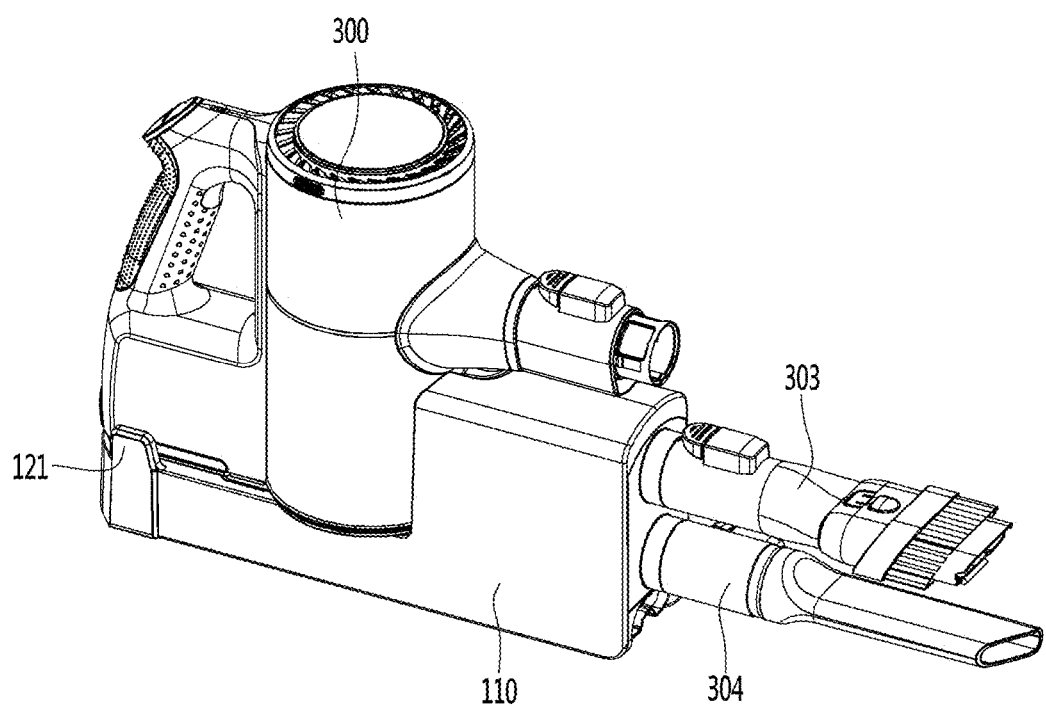
FIG. 14 is a view illustrating a state in which the first body is supported by a floor.

FIG. 14 is a view illustrating a state in which the charging stand body is supported by the floor.

Referring to FIG. 14, the rear surface 111 of the charging stand body 100 may be supported by the floor. To achieve this, the rear surface 111 of the charging stand body 100 may have a planar shape.

In this way, because the charging stand body 100 may be held in various schemes according to a usage situation, user convenience may be improved.

Although the battery is chargeable in the state in which the support device 10 supports the cleaner 300 in the abovementioned embodiment, the support device 10 may perform only a function of simply supporting the cleaner 300.

What is claimed is:

1. A support device of a cleaner, comprising:
   a base;
   a stand that extends upward from the base; and
   a charging stand body spaced apart from the base and connected to an upper end of the stand, the charging stand body having an inner surface configured to support a cleaner body of the cleaner,
   wherein the charging stand body comprises:
   a first body comprising (i) a first fixing part disposed at a first side of the inner surface and (ii) a second fixing part disposed at a second side of the inner surface facing the first fixing part, and
   a second body extending from the first body along an extending direction of the first and second fixing parts,
   wherein each of the first fixing part and the second fixing part defines a groove that is configured to guide movement of the cleaner body and that extends along a movement direction of the cleaner body relative to the inner surface, each of the first fixing part and the second fixing part being configured to support a first portion of the cleaner body and to separate the cleaner body from the charging stand body, and
   wherein the second body is configured to, based on the cleaner body being supported by the charging stand body, support a second portion of the cleaner body, the second portion being disposed below the first portion of the cleaner body.

2. The support device according to claim 1,
   wherein the second body is configured to support a lower portion of the cleaner body based on the cleaner body being supported by the charging stand body, and
   wherein the first and second fixing parts are configured to support an upper portion of the cleaner body based on the cleaner body being supported by the charging stand body.

3. The support device according to claim 1, wherein the second body extends from the first body along an up and down extending direction of the first and second fixing parts.

4. The support device according to claim 3, wherein the up and down extending direction of the first and second fixing parts is parallel to an extending direction of the stand.

5. The support device according to claim 1, wherein the second body extends from the first body along a front and rear extending direction of the first and second fixing parts.

6. The support device according to claim 5, wherein, based on the cleaner body being supported by the charging stand body, an extension tube of the cleaner body and the stand are spaced apart from each other along the front and rear extending direction of the first and second fixing parts.

7. The support device according to claim 1, wherein the second body is detachably coupled to an upper of the stand.

8. The support device according to claim 1, wherein the groove is recessed from each of the first and second sides of the inner surface.

9. The support device according to claim 8, wherein the second body extends from the first body along an extending direction of the groove.

10. The support device according to claim 9, wherein the groove is recessed from the first and second fixing parts and enables movement of the cleaner body in an up and down extending direction of the first and second fixing parts.

11. The support device according to claim 10, wherein the groove is recessed from the first and second fixing parts and configured to limit movement of the cleaner body in a front and rear extending direction of the first and second fixing parts.

12. The support device according to claim 8, wherein the grooves of the first and second fixing parts are configured to receive fixing protrusions that protrude from both side surfaces of the cleaner body.

13. The support device according to claim 1, wherein the groove comprises:
    a first fixing groove that defines an inlet configured to receive a fixing protrusion of the cleaner body; and
    a second fixing groove defined below the first fixing groove, and
    wherein a width of the first fixing groove is greater than a width of the fixing protrusion.

14. The support device according to claim 13, wherein a width of the second fixing groove is greater than or equal to the width of the fixing protrusion.

15. The support device according to claim 13, wherein a width of the second fixing groove is less than the width of the first fixing groove.

16. The support device according to claim 1, wherein the second body is disposed below the first body and protrudes forward relative to the first body.

17. The support device according to claim 1, wherein the first body defines the inner surface of the charging stand body.

* * * * *